3,322,756
2-AMINOALKYL-3-HYDROCARBON
QUINAZOLONES-(4)
Heinrich Ruschig, Bad Soden, Taunus, and Hans Hilmer, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 14, 1964, Ser. No. 367,568
Claims priority, application Germany, May 18, 1963, F 39,784; Feb. 28, 1964, F 42,147
14 Claims. (Cl. 260—247.2)

The present invention relates to quinazolone compounds which are distinguished by favorable physiological properties and particularly by an analgesic and sedative action. The compounds may, therefore, be used as analgesics exhibiting a sedative action. The invention also relates to processes for preparing the aforementioned quinazolone compounds and to processes for preparing pharmaceutical preparations exhibiting an analgesic and sedative action and containing the quinazolone compounds as active ingredients.

We have found a process for the manufacture of quinazolone derivatives of the general Formula I

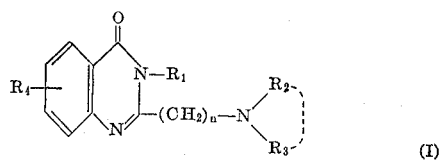

in which $R_1$ represents hydrogen, an alkyl group having from 1 to 4 carbon atoms, a phenyl group or a phenylalkyl group the alkyl substituent of which carries 1 to 2 carbon atoms; $R_2$ and $R_3$ may be equal or different, each representing hydrogen, a saturated or unsaturated alkyl group having from 1 to 4 carbon atoms or a phenylalkyl group the alkyl substituent of which carries 1 to 2 carbon atoms, or $R_2$ and $R_3$ together with the nitrogen atom form a heterocyclic ring which may also contain a further hetero atom, $R_4$ represents halogen in 6 or 7-position, advantageously chlorine or bromine, or an alkoxy group having from 1 to 4 carbon atoms, and $n$ is an integer from 1 to 3, wherein (a) A compound of the general Formula II

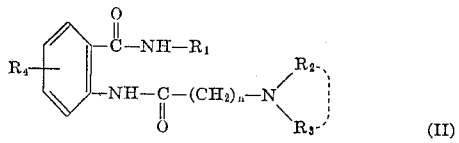

in which $R_1$–$R_4$ and $n$ have the meanings given above, is subjected to an intramolecular condensation at an elevated temperature, and if $R_1$ is hydrogen, the compound obtained is—if desired—alkylated or arylated, or (b) A 3- or 4-halogeno-anthranilic acid of the general Formula III

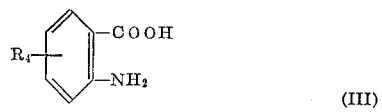

in which $R_4$ has the meaning given above, or a reactive derivative thereof, for example an ester of such a compound, is reacted with an amide of the general Formula IV

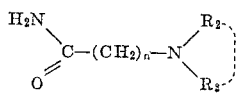

an imide acid ester of the general Formula V

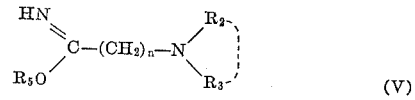

in which formulae $R_2$, $R_3$ and $n$ have the meanings given above and $R_5$ represents a low molecular alkyl radical, or with a correspondingly substituted nitrile or amidine of a basically substituted carbonic acid at an elevated temperature, and if desired, the compound thus obtained is alkylated or arylated at the amide nitrogen, or (c) A compound of the general Formula III or a reactive derivative thereof, for example an ester of such a compound is condensed with a halogeno-alkyl-imide acid ester of the general Formula VI

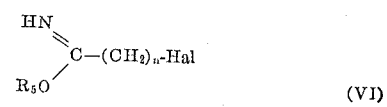

in which Hal represents a halogen atom, preferably a chlorine or bromine atom, into a ω-halogeno-alkyl-quinazolone- of the general Formula VII

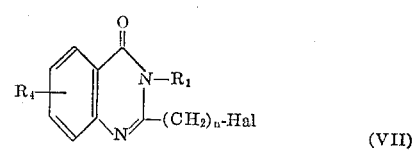

in which $R_1$, $R_4$ $n$ and Hal have the meanings given above, this compound obtained is then reacted with an amine of the general Formula VIII.

in which $R_2$ and $R_3$ have the meanings given above, and, if desired, the compound thus obtained is alkylated or arylated at the amide nitrogen.

The intramolecular condensation according to the process described (a) is carried out in a solvent either by heating a compound of the general Formula II above the melting point, advantageously to temperatures in the range of 180 to 250° C. or by heating to 60–140° C. with strongly basic agents, such as alkali metal hydroxide solutions, alcoholates or organic bases, such as piperidine.

The starting substances of the general Formula II can be prepared by reacting the corresponding 2-(ω-chloracyl-amino)-benzoic acid alkylamide derivatives of the general Formula IX with ammonia or an amide of the general Formula VIII

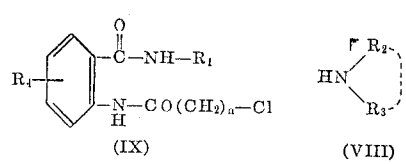

if desired in the presence of an inert organic solvent, such as benzene, and if desired under elevated pressure. As basic reactants there enter into consideration for example dimethyl amine, diethyl amine, di-n-propyl amine, di-isopropyl amine, di-n-butyl amine, pyrrolidine, piperidine, piperazine, N-methyl-piperazine, morpholine, 2,2-dimethyl-azetidine and hexamethylene imine.

The condensation according to the process described (b) is carried out on heating the starting substances to temperatures in the range of 160 and 180° C., advantageously with the use of amides or nitriles at 120° C.–180° C. and with the use of imide acid esters or amidines at 60° C.–120° C., if desired in a solvent, for example a low molecular alcohol and preferably at its boiling temperature.

As starting substances the following amides enter into consideration: piperidino-acetamide, morpholino-acetamide, pyrrolidino-acetamide, N-methylpiperazino-acetamide, β-piperidino-propionamide, 2,2-dimethyl-trimethylene-imino-acetamide (2,2-dimethyl-azetidino-acetamide), γ-dimethylamino-butyric acid amide and allylamino-acetamide.

As starting substances the following imide acid esters can be used: piperidino-acetamide acid ethyl ester, morpholino-acetamide acid ethyl ester, pyrrolidino-acetamide acid ethyl ester, N-methyl-piperazino-acetamide acid ethyl ester, β-piperidino-propionimide acid ethyl ester, 2,2-dimethyl-azetidino-acetamide acid methyl ester, γ-dimethylamino-butyric imide acid ethyl ester and allylamino-acetamide acid ethyl ester. Furthermore, the corresponding nitriles or amidines can be used.

The ring closure condensation according to the process described (c) is carried out by heating the starting substances to temperatures in the range of 60° C. and 120° C., is desired in a solvent, for example a low molecular alcohol, advantageously at its boiling temperature. The halogen atom is then replaced by the basic group, advantageously with the addition of an excess of the corresponding amine or of another basic agent binding hydrogen halide.

The products of the present invention can be converted into the corresponding salts by means of physiologically tolerable inorganic or organic acids. As inorganic acids there enter into consideration for example, hydrohalic acids, such as hydrochloric acid and hydrobromic acid, furthermore, sulfuric acid, phosphoric acid and amidosulfonic acid. As organic acids there may be mentioned for example, acetic acid, propionic acid, lactic acid, glycollic acid, gluconic acid, maleic acid, succinic acid, tartaric acid, benzoic acid, salicylic acid, citric acid, aceturic acid, hydroxy-ethane sulfonic acid and ethylenediaminotetracetic acid.

The products of the present invention can be used as medicaments which are particularly distinguished by their analgesic efficiency. The strength of their analgesic action is equal to that of the 4-dimethylamino-1-phenyl-2,3-dimethyl-pyrazolone-(5). Furthermore, the products obtained according to the present invention possess a distinct sedative action which the aforementioned known compound does not possess, but which is desired for analgesic medicaments. The analgesic action was examined in mice according to the light beam method by S. Gross (Helv. Physiol. Acta, vol. 5, p. 31 [1947]), whereas the sedative action was detected in mice excited by pervitin. In addition thereto, part of the products of the invention exhibited a spasmolytic and/or thymolytic action.

The following examples serve to illustrate the invention, but they are not intended to limit it thereto:

EXAMPLE 1

2-(N-methyl-piperazinomethyl)-3-methyl-6-chloroquinazolone-(4)-dihydrochloride 25 grams (0.077 mol) of 5-chloro-2-(N-methyl-piperazino-acetylamino)-benzoic acid methyl amide (prepared by reaction of 1 mol of 5-chloro-2-chloracetylamino-benzoic acid methyl amide with 2–3 mols of N-methylpiperazine) are heated for 30 minutes to 225–230° C. After cooling, the product solidifies, it is pulverized and recrystallized twice from acetone with the use of charcoal. The base obtained melts at 158.5–159.5° C., it is converted into the dihydrochloride by dissolving it in methanol and adding ethanolic hydrochloric acid and precipitated by the addition of ether. The dichlorine hydrate melts at 260° C. with decomposition.

EXAMPLE 2

2-dimethylaminomethyl-3-methyl-6-chloroquinazolone-(4)-hydrochloride 7 grams (0.026 mol) of 5-chloro-2-dimethylamino-acetylamino-benzoic acid methyl amide (prepared by reaction of 1 mol of 5-chloro-2-chloracetylamino-benzoic acid methyl amide with 2–3 mols of dimethyl amine, are dissolved in 52 ml. of ethanol, mixed with 26 ml. of 2 N-sodium hydroxide solution and heated under reflux for 20 minutes. The cooled solution is diluted with water and extracted with ether. The ether extract is dried, and the oily residue is triturated with petroleum ether. The crystalline product thus obtained is filtered off and washed with petroleum ether. In order to purify the base it is dissolved in dilute hydrochloric acid, the solution is adjusted to pH 6 by adding sodium hydroxide solution and clarified with charcoal. By slowly adding further quantities of dilute sodium hydroxide solution the base is precipitated, filtered and washed with water. The base thus obtained, melting at 91.5–95.5° C., is again dissolved in methanol, the solution is clarified with charcoal, and the filtrate is mixed with ethanolic hydrochloric acid until it shows a strongly acid reaction, and with ether until it becomes turbid. There is obtained a crystalline product which melts at 257° C. with decomposition.

EXAMPLE 3

2-(β-piperidino-ethyl)-3-methyl-6-chloroquinazolone-(4)-dihydrochloride 33 grams (0.12 mol) of 5-chloro-2-(β-chloropropionylamino)-benzoic acid methyl amide and 30.5 grams (0.36 mol) of piperidine are heated under reflux in 240 ml. of benzene for 1 hour while stirring. After cooling, the filtrate is concentrated. The so obtained oily 5-chloro-2-(β-piperidino-propionylamino)-benzoic acid methyl amide is dissolved in 240 ml. of ethanol, the solution is mixed with 120 ml. of 2 N-sodium hydroxide solution and heated under reflux for 20 minutes. The reaction solution is clarified with charcoal in the heat, and the cold filtrate is slowly mixed with water while stirring. A crystalline product precipitates which melts at 96–98° C. The dihydrochloride of the base is obtained as described in Example 1 and melts at 180° C. with decomposition.

EXAMPLE 4

2-(β-pyrrolidino-ethyl)-3-methyl-6-chloroquinazolone (4)-dihydrochloride

The oily 5-chloro-2-(β-pyrrolidino-propionylamino)-benzoic acid methyl amide, prepared by reacting 13.8 grams (0.05 mol) of 5-chloro-2-(β-chloropropinonyl-amino)-benzoic acid methyl amide with 10.6 grams (0.15 mol) of pyrrolidine, is dissolved without further purification in 100 ml. of ethanol, 50 ml. of 2 N-sodium hydroxide solution are added, and the solution is heated under reflux for 20 minutes. The reaction solution is clarified with charcoal while being still hot, and water is slowly added to the filtrate. The so obtained crystals are washed with water and dried in the air. The product melts at 98–98.5° C. The dihydrochloride is prepared according to the method described in Example 1 and melts at 186–187° C. with decomposition.

EXAMPLE 5

2-morpholinomethyl-3-methyl-7-chloroquinazolone (4)-hydrochloride 31.2 grams (0.1 mol) of 4-chloro-2-morpholino-acetylamino-benzoic acid methyl amide are dissolved in 200 ml. of ethanol, the solution is mixed with 100 ml. of 2 N-sodium hydroxide solution and heated under reflux for 20 minutes. The solution is clarified in the heat with charcoal, water is slowly added, and the precipitated crystalline mass is filtered off. The resulting base melts at 168.5–169° C. and is converted—as described in Example 1—into the hydrochloride which melts at 253–254° C. with decomposition.

EXAMPLE 6

2-(2',2'-dimethyl-azetidino-methyl)-3-methyl 7-chloroquinazolone-(4)-sulfate 31 grams (0.1 mol) of 4-chloro-2-(2',2'-dimethyl-azetidino-acetylamino)-benzoic acid methyl amide are dissolved in a mixture of 200 ml. of ethanol and 100 ml. of 2 N-sodium hydroxide solution and heated under reflux for 20 minutes. The reaction mixture is worked up as described in Example 4. The so obtained base melts at 113–114° C. In order to convert it into the sulfate it is dissolved in hot methanol and mixed in the cold with an excess of concentrated sulfuric acid, 200 ml. of acetone and ether until it becomes turbid. On cooling with ice, the sulfate crystallizes; it is filtered off and washed with acetone and ether. The sulfate melts at 166° C. with decomposition.

EXAMPLE 7

2-dimethylaminomethyl-3-methyl-7-chloroquinazolone (4)-hydrochloride 26.1 grams (0.1 mol) of 4-chloro-2-chloracetylamino-benzoic acid methyl amide and 300 ml. of an ethanolic dimethyl amine solution are heated for 2 hours at 100° C. in an autoclave. The ethanol is then evaporated, and the residue is taken up in ether and water. The organic phase is washed with water several times and then extracted with dilute hydrochloric acid. The extract of hydrochloric acid is adjusted to pH 5 by means of sodium hydroxide solution and clarified with charcoal. The filtrate is rendered strongly alkaline, the precipitating oil is taken up in ether, and the solvent is evaporated.

The 4-chloro-2-(dimethylamino-acetylamino)-benzoic acid methyl amide thus obtained is dissolved in 100 ml. of ethanol and heated under reflux for 20 minutes with 50 ml. of 2 N-sodium hydroxide solution. The reaction mixture is worked up as described in Example 4. The resulting base melts at 101–102° C. It is converted into the hydrochloride as described in Example 1 and melts at 258° C. with decomposition.

EXAMPLE 8

2-[N-methyl-piperazinomethyl]-3-methyl-6 bromoquinazolone-(4)-dihydrochloride 45.8 grams (0.15 mol) of 5-bromo-2-chloracetylamino-benzoic acid methyl amide and 45 grams (0.45 mol) of N-methyl-piperazine are heated under reflux for 2 hours in 300 ml. of benzene while stirring. The reaction mixture is cooled and extracted twice with dilute hydrochloric acid. The extract of hydrochloric acid is adjusted to pH 4–5 by means of dilute sodium hydroxide solution, clarified with charcoal and mixed with sodium hydroxide solution until it becomes turbid. After the beginning of the crystallization further quantities of sodium hydroxide solution are added.

The resulting 5-bromo-2-(N-methylpiperazino-acetylamino)-benzoic acid methyl amide is dissolved in 300 ml. of ethanol after filtering and washing with water and heated under reflux for 20 minutes with 150 ml. of 2 N-sodium hydroxide solution. The reaction mixture is worked up as described in Example 4. The so obtained base melts at 165.5–166.5° C. The dihydrochloride is prepared as described in Example 1 and melts at 278–280° C. with decomposition.

EXAMPLE 9

2-dimethylaminomethyl-3-methyl-7-bromoquinazolone (4)-hydrochloride

The crude 4-bromo-2-dimethylamino-acetylamino-benzoic acid methyl amide prepared according to the method described in Example 7 from 45.8 grams (0.15 mol) of 4-bromo-2-chloracetylamino-benzoic acid methyl amide and 300 ml. of an ethanolic dimethyl amine solution of 25% strength, is dissolved in 300 ml. of ethanol and heated under reflux for 20 minutes with 150 ml. of 2 N-sodium hydroxide solution. The reaction mixture is worked up as described in Example 4. The base thus obtained melts at 109–110° C. The hydrochloride is prepared as described in Example 1 and melts at 260–261° C., with decomposition.

EXAMPLE 10

2-[γ(N-methylpiperazino)-propyl]-3-methyl-6 chloroquinazolone-(4)

43.4 grams (0.15 mol) of 5-chloro-2-[γ-chlorobutyryl-amino]-benzoic acid methyl amide and 60 grams (0.6 mol) of N-methyl-piperazine are heated under reflux for 1 hour while stirring. After cooling to 80° C. crystallization sets in and is completed by the addition of water. After cooling, the crystalline product is filtered off, washed with water and—while it is still moist—dissolved in dilute hydrochloric acid. The solution is adjusted to pH 4–5 by means of dilute sodium hydroxide solution and clarified with charcoal. The filtrate is rendered strongly alkaline with sodium hydroxide solution; after a short time the quinazolone base crystallizes in the form of leaflets, it is filtered off, washed with water and dried. The base melts at 130–131° C. It is converted into the trihydrochloride as described in Example 1 and melts at 240–242° C. with decomposition.

EXAMPLE 11

2-piperidinomethyl-3-methyl-6-chloroquinazolone-(4)

5.6 grams (0.02 mol) of 2-piperidinomethyl-6-chloroquinazolone-(4), prepared from 8.6 grams (0.035 mole) of 5-chloro-2-chloracetylamino-benzoic acid amide and 8.9 grams (0.105 mol) of piperidine with subsequent inner-molecular condensation according to the process described in Example 5, are introduced into a solution of 0.46 grams (0.02 mol) of sodium in 50 ml. of absolute ethanol. After the addition of 2.8 grams (0.02 mol) of methyl iodide, the reaction mixture is heated under reflux for 3 hours, clarified with charcoal, rendered strongly alkaline by means of sodium hydroxide solution and mixed with water until it becomes turbid. After several hours the crystallization is completed by adding further quantities of water. The crystalline mass is filtered off, washed with water and recrystallized from ethanol. White leaflets are obtained which melt at 144.5–145.5° C. The mixed melting point with 2-piperidinomethyl-3-methyl-6-chloroquinazolone-(4), prepared according to Example 1, shows no depressions.

EXAMPLE 12

2-piperidinomethyl-6-chloroquinazolone-(4)

51.5 grams (0.3 mol) of 5-chloro-2-amino-benzoic acid and 65 grams (0.45 mol) of piperidinoacetamide are heated for 7 hours on the oil bath at 150° C. After cooling, the mixture is heated with a 2 N-sodium carbonate solution, extracted with methylene-chloride, and the precipitated methylene chloride solution is extracted four times with 10 N-sodium hydroxide solution. The extract of sodium hydroxide solution is clarified with charcoal, mixed with hydrochloric acid until the precipitate, which was first separated, has dissolved again, and it is rendered alkaline by slowly adding a 2 N-sodium carbonate solution, thus causing the crystallization of the quinazolone. After recrystallization from alcohol-water, white needles are obtained which melt at 161.5–162.5° C.

EXAMPLE 13

2-(β-piperidinoethyl)-6-chloroquinazolone-(4)

25.7 grams (0.1 mol) of β-piperidinopropionimide acid ethyl ester dihydrochloride are introduced into a mixture, cooled at −10° C., of 100 grams of a potassium carbonate solution of 40% strength and 100 ml. of ether. After shaking, the ethereal solution is separated, dried with potassium carbonate, and the ether is removed. The remaining oil is poured into a hot solution of 17.1 grams (0.1 mol) of 5-chloro-2-amino-benzoic acid in 100 ml. of methanol and heated under reflux for 30 minutes. The reaction mixture is clarified with charcoal, while still being hot, and poured into water. A smeary mass precipitates which is taken up in methylene chloride. The methylene-chloride solution is extracted twice with dilute hydrochloric acid, the pH-value of the solution is adjusted to 3 with dilute sodium hydroxide solution, and after clarification with charcoal, the quinazolone is precipitated by means of a sodium carbonate solution. After recrystallization from xylene, crystalline needles are obtained which melt at 191.5–192.5° C.

EXAMPLE 14

2-chloromethyl-6-chloroquinazolone-(4)

31.6 grams (0.2 mol) of chloroacetimide acid ethyl ester hydrochloride are introduced into a mixture cooled to −10° C. and consisting of 200 grams of a potassium carbonate solution (of 40% strength) and 200 ml. of ether. After shaking, the ethereal solution is separated, dried with potassium carbonate, and the ether is removed. The oily imide acid ester, remaining as residue, is poured into a hot solution of 34.3 grams (0.2 mol) of 5-chloro-2-amino-benzoic acid in 200 ml. of methanol. After crystallization, the reaction product is filtered with suction, washed with ice-cold methanol and dried. Crystalline needles are obtained which decompose at 241–242° C.

EXAMPLE 15

2-piperidinomethyl-6-chloroquinazolone-(4)

6.9 grams (0.03 mol) of 2-chloromethyl-6-chloroquinazolone-(4) are portionwise introduced at 35–40° C. into 25 ml. of piperidine, while stirring and cooling moderately. The mixture is then heated under reflux for 5 minutes, cooled, dissolved in water and acidified with hydrochloric acid. The pH-value of the solution is adjusted to 3 by means of a sodium carbonate solution. After clarification with charcoal, the quinazolone is precipitated by dropwise adding a sodium carbonate solution, the finely crystalline precipitate is filtered with suction, washed with water and dried. The product obtained melts at 162.5–163° C. The mixed melting point with the 2-piperidino-methyl-6-chloroquinazolone-(4), prepared according to Example 12, shows no depression.

The compounds shown in the following table were prepared according to the working methods described in the aforementioned examples:

Compounds of the general formula:

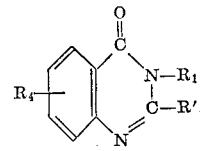

| Example | Working method according to example— | $R_1$ | $R_4$ | $R'$ | Melting point of the base, ° C. | Composition of the salt | Melting point of the salt (decomp.), ° C. |
|---|---|---|---|---|---|---|---|
| 16 | 1 | methyl- | 6-chloro- | piperidinomethyl- | 145–145.5 | 2.HCl | 256. |
| 17 | 1 | ---do--- | ---do--- | morpholinomethyl- | 199.5–200.5 | HCl | 252. |
| 18 | 1 | ---do--- | ---do--- | 2,2-dimethylazetidinomethyl- | | HCl | 199–203. |
| 19 | 1 | ---do--- | ---do--- | pyrrolidinomethyl- | 131–132 | HCl | About 270. |
| 20 | 1 | ---do--- | ---do--- | diethylaminomethyl- | 104–105 | | |
| 21 | 2 | ---do--- | ---do--- | di-n-propylaminomethyl- | 128.5–129.5 | HCl | 211–213. |
| 22 | 2 | ---do--- | ---do--- | piperazinomethyl- | 174.5–175.5 | 3.HCl | Beginning at 270. |
| 23 | 2 | ---do--- | ---do--- | diisopropylaminomethyl- | 130.5–131.5 | | |
| 24 | 2 | ---do--- | ---do--- | di-n-butylaminomethyl- | 86.5–87 | | |
| 25 | 3 | ---do--- | ---do--- | β-morpholinoethyl- | 96–99 | 2.HCl | 179–180. |
| 26 | 3 | ---do--- | ---do--- | β-(N-methyl-piperazino)-ethyl- | 76.5–81.5 | 3.HCl | Beginning at 195. |
| 27 | 4 | ---do--- | ---do--- | β-(2,2-dimethylazetidino)-ethyl- | 86–88 | 2.H₂SO₄.H₂O | 147–148.5. |
| 28 | 4 | ---do--- | ---do--- | β-di-n-propylaminoethyl- | | 2.H₂SO₄ | 152. |
| 29 | 5 | ---do--- | 7-chloro- | piperidinomethyl- | 115–115.5 | HCl | 250–251. |
| 30 | 5 | ---do--- | ---do--- | pyrrolidinomethyl- | 80.5–81.5 | HCl | 271. |
| 31 | 5 | ---do--- | ---do--- | N-methyl-piperazinomethyl- | 143–146 | 2.HCl | 233. |
| 32 | 3 | ---do--- | ---do--- | piperazinomethyl- | | 2.HCl.2H₂O | Beginning at 180. |
| 33 | 5 | ---do--- | ---do--- | di-n-propylaminomethyl- | 56–58.5 | H₂SO₄.H₂O | 205.5–207.5. |
| 34 | 4 | ---do--- | ---do--- | di-n-butylaminomethyl- | | H₂SO₄.H₂O | 179.5–182. |
| 35 | 5 | ---do--- | ---do--- | diethylaminoethyl- | 72.5–73.5 | HCl | 235. |
| 36 | 3 | ---do--- | ---do--- | β-piperidinoethyl- | 84–96 [1] | 2.HCl | 194–196. |
| 37 | 4 | ---do--- | ---do--- | β-pyrrolidinoethyl- | 78–81 | 2.HCl | 177–178. |
| 38 | 3 | ---do--- | ---do--- | β-morpholinoethyl- | 129–130 | 2.HCl | 173–175. |
| 39 | 7 | hydrogen- | 6-chloro- | dimethylaminomethyl- | 182.5–184 | 2.HCl | 250–251. |
| 40 | 6 | ethyl- | ---do--- | N-methyl-piperazino-methyl- | | 2.HCl | 229–230. |
| 41 | 7 | ---do--- | ---do--- | dimethylaminomethyl- | 87–88.5 | HCl.H₂O | 235. |
| 42 | 1 | phenyl- | ---do--- | N-methyl-piperazinomethyl- | 174–175.5 | 2.HCl | >300. |
| 43 | 1 | n-propyl- | ---do--- | N-methyl-piperazinomethyl- | 120.5–122 | 2.HCl | 273–275. |
| 44 | 1 | benzyl- | ---do--- | N-methyl-piperazinomethyl- | 148.5–150.5 | 2.HCl | 257–260. |
| 45 | 1 | ---do--- | ---do--- | dimethylaminomethyl- | 117–119 | HCl | 196–198. |
| 46 | 6 | hydrogen- | 7-chloro- | N-methyl-piperazinomethyl- | 175.5–176.5 | 2.HCl | 250–251. |
| 47 | 7 | ---do--- | ---do--- | dimethylaminomethyl- | 150.5–151.5 | 2.HCl | 231–233. |
| 48 | 1 | ethyl- | ---do--- | N-methyl-piperazinomethyl- | 127–129 | 2.HCl.H₂O | 255. |
| 49 | 9 | methyl- | 6-Bromo- | dimethylaminomethyl- | 113–113.5 | HCl | 247. |
| 50 | 8 | ---do--- | 7-bromo- | N-methyl-piperazinomethyl- | 153.5–154.5 | 2.HCl | 251. |

[1] Partially containing crystal water.

EXAMPLE 51

*2-(N-methyl-piperazinomethyl)-3-methyl-6-ethoxy-quinazolone-(4)-dihydrochloride*

45 grams (0.135 mol) of 5-ethoxy-2-(N-methyl-piperazinoacetylamino)-benzoic acid methyl amide (prepared by reaction of 1 mol of 5-ethoxy-2-chloracetylamino-benzoic acid methyl amide with 2-3 mols of N-methylpiperazine) are dissolved in 150 ml. of ethanol, mixed with 75 ml. of 2 N-sodium hydroxide solution and heated under reflux for 20 minutes. The solution, which is still hot, is clarified with charcoal and concentrated in vacuo until no turbidities occur. The crystalline product, which precipitates after cooling, is filtered with suction, washed with water and dried at 100° C. Thus, a base melting at 148.5–149.5° C. is obtained which is converted into the dichlorine hydrate, melting at 229–231° C. with decomposition, by dissolving it in aqueous hydrochloric acid and precipitating it by means of acetone.

EXAMPLE 52

*2-dimethylaminomethyl-3-methyl-6-n-propoxy-quinazolone-(4)-hydrochloride*

The oil, obtained by reacting 57.1 grams (0.2 mol) of 5-n-propoxy-2-chloracetylamino-benzoic acid methyl amide with an excess ethanolic dimethyl amine solution, is dissolved in 300 ml. of ethanol. 150 ml. of 2 N-sodium hydroxide solution are added and heated for 20 minutes under reflux. The hot solution is clarified with charcoal, and the ethanol is evaporated in vacuo. The precipitated oil is taken up in methylene chloride, and the methylene chloride solution is clarified with charcoal.

The residue, remaining after the evaporation of the methylene chloride, is suspended in 400 ml. of water, and concentrated hydrochloric acid is added until the solution is complete. The pH-value is adjusted to 6 by the addition of dilute ammonia. After clarification with charcoal, dilute ammonia is slowly added drop by drop while stirring. The base, which has crystallized, melts at 64–65.5° C. and is converted into the hydrochloride by dissolving it in ether and precipitating it with ethereal hydrochloric acid. The hydrochloride is recrystallized from water/acetone with the use of charcoal and melts at 189–190° C. with decomposition.

EXAMPLE 53

*2-dimethylaminomethyl-3-benzyl-6-n-propoxy-quinazolone-(4)-hydrochloride*

46.2 grams (0.125 mol) of 5-n-propoxy-2-dimethylamino-acetyl-amino-benzoic acid benzyl amide are heated at 220–225° C. in a water-jet vacuum for 90 minutes. The melt is cooled to 150° C. in vacuo, dissolved in 150 ml. of xylene, clarified with charcoal, and the filtrate is cooled with ice. The crystallization is completed by the addition of 150 ml. of petroleum ether. The resulting base is recrystallized from ethanol of 60% strength and melts at 110–111° C. The base is suspended in 50 ml. of ethanol and dissolved by adding ethanolic hydrochloric acid. After the addition of ether, the hydrochloride crystallizes out. It melts at 216–218° C. with decomposition.

Compounds of the general formula

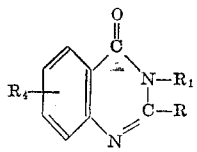

| Example | Working method according to example— | $R_1$ | $R_4$ | R | Melting point of the base, °C. | Composition of the salt | Melting point of the salt (decomp.), °C. |
|---|---|---|---|---|---|---|---|
| 54 | 1 | methyl | 7-ethoxy | N-methylpiperazino-methyl | 133–134.5 | 2.HCl.H₂O | 247–248. |
| 55 | 2 | do | do | dimethylaminomethyl | 117.5–118.5 | HCl | 245–246. |
| 56 | 1 | do | 6-ethoxy | do | 95.5–96.5 | HCl | 215–216. |
| 57 | 1 | benzyl | do | N-methylpiperazino-methyl | 153–154 | 2.HCl.H₂O | Beginning at 196. |
| 58 | 3 | do | do | dimethylaminomethyl | 90.5–93 | HCl.2 H₂O | Beginning at 120. |
| 59 | 2 | methyl | do | allylaminomethyl | 63–64.5 | .HCl | 224–225. |
| 60 | 2 | do | 6-n-propoxy | N-methylpiperazinomethyl | 102–103.5 | .2HCl.H₂O | 224–226. |

We claim:
1. 2-(N-methyl-piperazinomethyl)-3-methyl-6-chloro-quinazolone-(4).
2. 2-dimethylaminomethyl-3-methyl-6-chloroquinazolone-(4).
3. 2-(β-piperidinoethyl)-3-methyl-6-chloroquinazolone-(4).
4. 2-(β-pyrrolidinoethyl)-3-methyl-6-chloroquinazolone-(4).
5. 2-morpholinomethyl-3-methyl-7-chloroquinazolone-(4).
6. 2-(2',2'-dimethyl-azetidino-methyl)-3-methyl-7-chloroquinazolone-(4).
7. 2-[γ-(N-methylpiperazino)-propyl]-3-methyl-6-chloroquinazolone-(4).
8. 2-piperidinomethyl-3-methyl-6-chloroquinazolone-(4).
9. 2-dimethylaminomethyl-3-methyl-6-ethoxy-quinazolone-(4).
10. (2-methyl-piperazinomethyl)-3-n-propyl-6-chloroquinazolone-(4).
11. 2-(N-methyl-piperazinomethyl)-3-benzyl-6-chloroquinazolone-(4).
12. 2-(4'-methyl-piperazino-1'-methyl)-3-benzyl-6-ethoxy-quinazolone-(4).
13. 2-(4'-N-methylpiperazino-1'-methyl)-3-benzyl-6-n-butoxy-quinazolone-(4).
14. A quinazolone compound of the formula

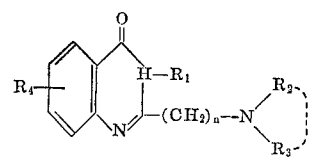

and the acid addition salts of said compound with physiologically tolerable acids, wherein $R_1$ is a member selected from the group consisting of alkyl having up to 4 carbon atoms; phenyl; and phenylalkyl in which the alkyl group has up to 2 carbon atoms; $R_2$ and $R_3$, taken alone, are each selected from the group consisting of hydrogen;

alkyl and alkenyl having up to 4 carbon atoms; and phenylalkyl in which the alkyl group has up to 2 carbon atoms; $R_2$ and $R_3$, taken together with the nitrogen atom, form a member selected from the group consisting of pyrrolidino; piperidino; piperazino; N-methyl piperazino; morpholino; azetidino; and dimethyl azetidino; $R_4$ is a member selected from the group consisting of chlorine and bromine in the 6- or 7-position and alkoxy having up to 4 carbon atoms; and $n$ is an integer from 1 to 3.

No references cited.

ALEX MAZEL, *Primary Examiner.*

JOSE TOVAR, *Assistant Examiner.*